Aug. 24, 1954    U. MUNSCHAK    2,687,468
REMOTE-CONTROLLER FOR ELECTRIC HEATING APPLIANCES
Filed June 21, 1951    2 Sheets-Sheet 2
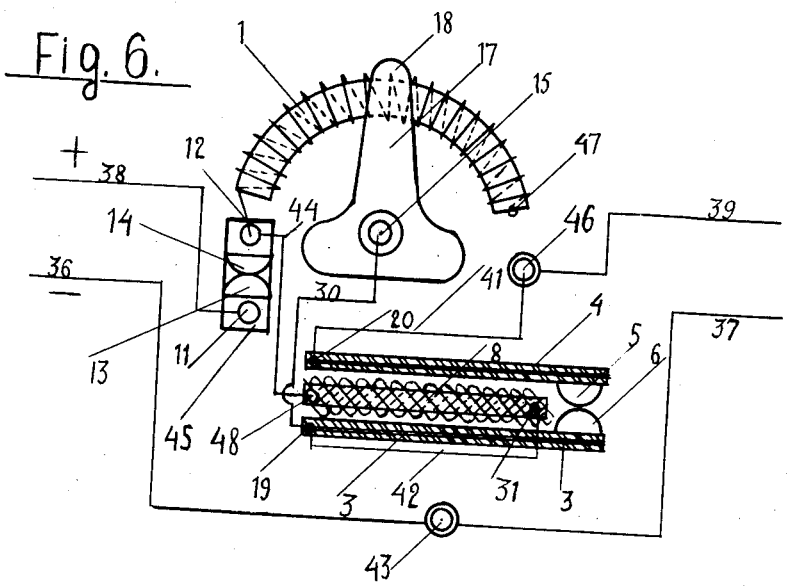
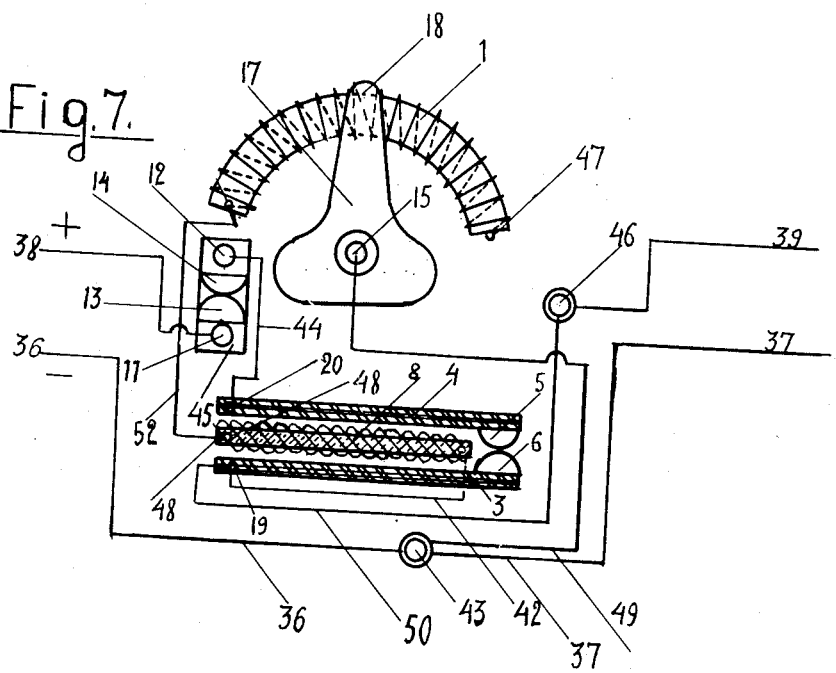
INVENTOR.
Uscher Munschak
BY
Richards Geier
ATTORNEYS Patented Aug. 24, 1954

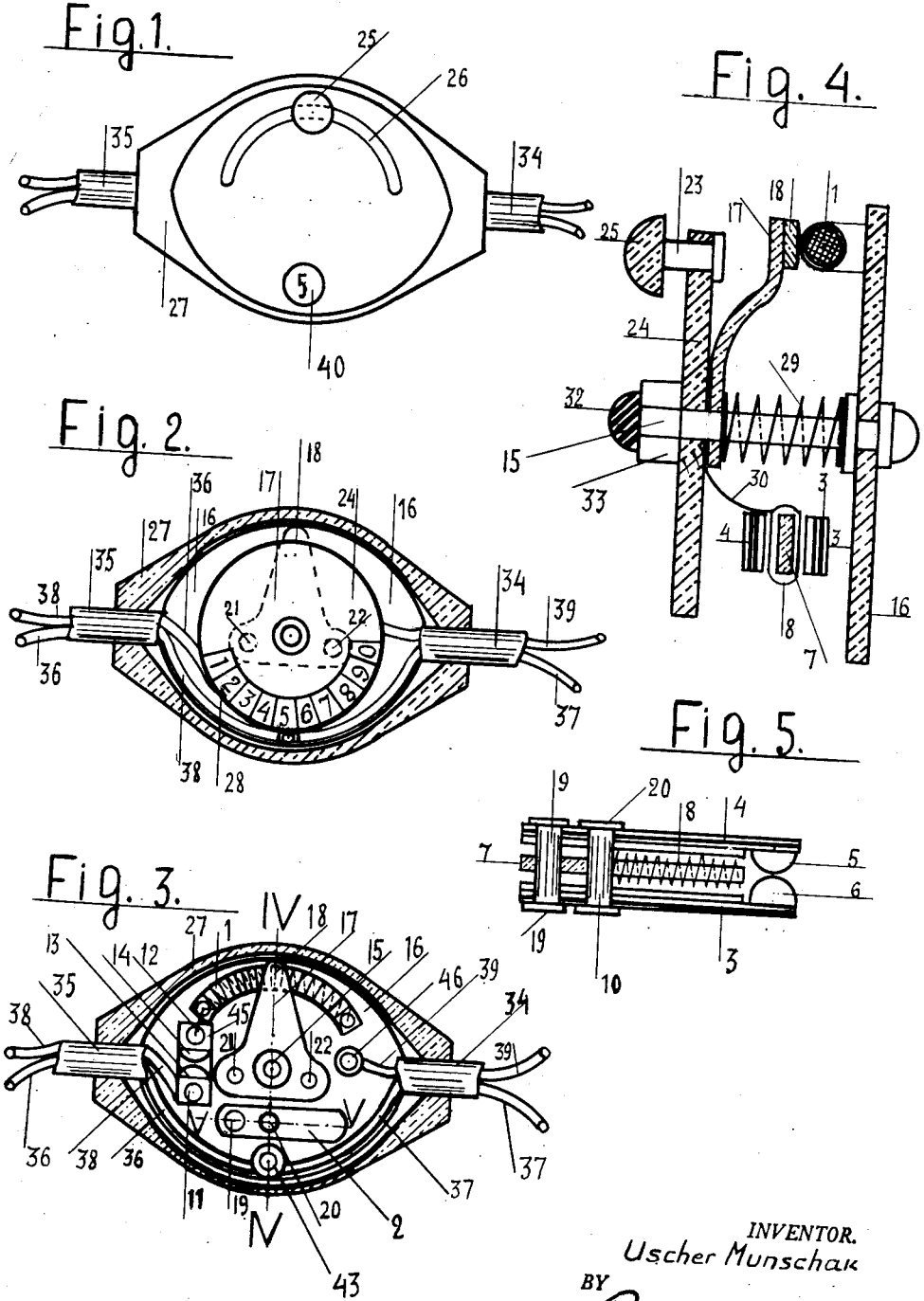

2,687,468

UNITED STATES PATENT OFFICE 2,687,468

REMOTE-CONTROLLER FOR ELECTRIC HEATING APPLIANCES

Uscher Munschak, New York, N. Y.

Application June 21, 1951, Serial No. 232,684

4 Claims. (Cl. 219—20)

This invention relates to electrical devices for the regulation of energy input into electrical heating appliances and refers, more particularly to a heat control located remotely from the appliances controlled, specifically such appliances as: ranges, stoves, radiators, heaters, pressing irons, heating pads, blankets, garments, homes, etc.

The primary objects of this invention are accordingly the provision of a device of this type which is simple to use, accurate in function, and economical in production.

These and other objects which will appear from the following disclosure are attained in the following manner: A thermostatic device having integrated heating elements, all contained within a single housing is provided in the line supplying current to the appliance controlled. The device functions to make and break the circuit supplying energy to the appliance. It is apparent that the energy input into the regulated appliance will be dependent on the frequency and the duration of the cycles of make and break effected by the control device. This may be formulated as follows:

W. T. C.=watt hours, where W is the wattage of the heating appliance, T is the time of operation of the appliance and C is a coefficient which is determined by the formula:

$$C = \frac{t_1}{t_1 + t_2}$$

wherein $t_1$ is the duration of effective energy input during a cycle and $t_2$ is the time period during which the circuit is interrupted; the reciprocal of the sum of $t_1$ and $t_2$ may be referred to as the frequency of circuit interruption.

The casing in which the entire mechanism is located is heated by the provision of heating resistances therein and the inside temperature is maintained at a constant level by a thermostatic device contained within the casing. As this temperature is simultaneously influenced by the outside temperature it follows that the thermostatic device will be responsive to the heat of said heating resistances and to the temperature outside of the casing.

Within a casing are contained a thermostatic device, a fixed resistance heating element of variable heating effect and a variable resistance (also contributing heat). Both resistance elements serve to provide a temperature within the casing which may vary considerably from the ambient temperature outside the casing. The variable resistance serves to control the amperage of the heating element and hence the function of the thermostat which controls in turn the passage of energy to the appliance controlled.

The greater this amperage is, at the constant ambient temperature of the bimetallic strips, the lesser will be $t_1$, which is the time necessary to heat them, the greater will be the frequency of the current interruption and the lesser will be the energy input in the regulated appliance, and inversely, in accordance with the above stated formulae.

In drawings illustrating preferred embodiments:

Fig. 1 is a top plan view of the device.

Fig. 2 is a top plan view of the device with its cover removed showing the regulator disc.

Fig. 3 is a top plan view with the regulated disc removed.

Fig. 4 is a sectional view on the line IV—IV of Fig. 3, on an enlarged scale.

Fig. 5 is a sectional view of the thermostatic device taken on line V—V of Fig. 3, on an enlarged scale.

Fig. 6 is a diagram of the electrical connections.

Fig. 7 is a diagram of the electrical connections of another embodiment of this invention.

The remote control device shown in Figures 1 to 6 includes a casing 27 containing a variable resistance 1, and a thermostatic device 2 (as best seen in Fig. 3) comprising two bimetallic strips 3 and 4 (Fig. 5) having contacts 5 and 6. Between these bi-metallic strips a heat retaining insulating member 7 is provided having wound thereon a fixed resistance heating body 8 (Figs. 4 and 5). The bi-metallic strips, the insulating member and the heating member are retained in a fixed relative position by means of rivets 9 and 10 (Fig. 5).

An on-off switch is provided having terminals 11 and 12 carrying contacts 13 and 14 (as best seen in Figs. 3 and 6).

Variable resistance 1 is provided with a sliding contact 18 at the end of lever 17 rotating on a pivot 15 mounted on insulating plate 16 (Fig. 4).

The rivets 9 and 10 are provided with terminals 19 and 20 insulated from each other and from members 3, 4 and 8.

The on-off switch comprising contacts 13 and 14 is actuated by a button on the bottom of a disc 24. The disc 24 is fixed on the lever 17 by means of rivets 21 and 22 (Figs. 3 and 4). Fixed to the disc 24 by means of a bolt 23 is a knob 25 which moves along the exposed slit 26 provided in the cover of the casing 27, as seen in Fig. 1. Movement of the knob 25 rotates the disc 24 which carries on its face a dial 28, containing a series of numbers which are observable through an aperture 40 in the casing. Electrical contact is insured by means of spring 29 which encloses the pivot 15 and which provides a connection between the lever 17 and the wire 30, connecting the variable resistance 1 to the fixed heater resistance 8 (Fig. 4). The disc 24 and the lever 17 are maintained in position and insulated from the outer casing 27 by means of an insulating member 32 which serves also as a locking means for the nut 33. The insulator 32 may be advantageously made of rubber and positioned so that the cover of casing 27 bears thereon, whereby frictional resistance to the turning of the mechanism in the casing is increased.

Supply cables 34 and 35 (Fig. 3) contain the conductors causing the flow of electrical current through the control device. Conductor 36 (Fig. 3) passes through the control device without being engaged by any of the electrical elements therein. Conductor 38 (Fig. 3) leads to terminal 11 of the on-off switch and is connected with the elements of the device, as will be more fully explained hereinafter. Conductor 39 is the second conductor in cable 34.

The electrical connections of the device are as follows:

In the embodiment of Fig. 6 the supply current is introduced to the control device by wire 38 of supply cable 35 through terminal 11, contacts 13 and 14, terminal 12, wire 44, terminal 43, heater element 8, wire 42 and terminal 19 of the metallic strip 3, which is here shown in the open position but which, when closed, permits passage of current through contacts 6 and 5, the bi-metallic strip 4, terminal 20, wire 41, terminal 46 and the wire 39 leading to the appliance which is being regulated. Variable resistance 1 is connected in shunt to the heater element 8 by means of wire 30 leading from pivot 15 of lever 17 to terminal 19, wire 42 and terminal 31 of the heater element 8. The wire 44 which is connected to the terminal 48 of the heater element 8 completes the circuit at the terminal 12 to which is connected one end of the resistance 1.

The variable resistance 1 and the fixed resistance 8 though connected in parallel to each other are in series with the bi-metallic elements 3, 4 and the regulated appliance. The advantage of this arrangement is that the amperage of the supply current remains practically unaffected since the resistances are very small in the relation to the resistance of regulated appliance. The power consumption of the device is insignificant, not exceeding one to three percent of the wattage of the regulated appliance. The amperage of resistance 8 which is connected in parallel to variable resistance 1 is dependent on the position of sliding contact 18 which regulates the ohmic value provided in the circuit by resistance 1. Thus, by regulating the ohmic value of resistance 1 the current flowing through the heating resistance 8 is regulated. This in turn controls the time period during which the bi-metallic strips 3, 4 are in engagement. This controls the supply of current to the regulated appliance. But, when the contact 18 is in the position adjacent to the terminal 12, the resistances 1 and 8 become short-circuited, the thermostatic elements will not be heated and the supply current will flow unaffected through the thermostatic device to the regulated appliance which will then function at its full power. Thus the invention provides a remotely located heat responsive switch combined with two resistances of variable heating effect to control the flow of current to a heating appliance.

The operation of the device is as follows:

The control device is connected by cable 34 (Figs. 2 and 3) to the heating appliance (not shown). Cable 35 is connected to an electric supply source, so that current will pass through resistance elements 1 and 8. The increased temperature in the casing 27 which is determined by the flow of current through the resistance 7 and the heating resistance 8 as regulated by variable resistance 1, will cause bi-metallic strips 3 and 4 to spread, thereby breaking contact between 5 and 6 and interrupting the flow of current to the heating appliance and through the control device itself. The resulting cooling causes the contacts 5 and 6 to come together again, thus completing the circuit. It is thus seen that the frequency of current interruption is dependent on resistance 1, since this resistance may be varied by moving contact 18. It is thus possible to control the periods of flow of current to the heating appliance.

In the embodiment of Fig. 7 wherein the same parts are designated by the same numerals, the two resistance elements 1 and 8 are connected in series and then the series-coupled elements are connected in parallel to the regulated appliance, the thermostatic device being included in series in the supply circuit. The connection of controller and appliance in series is effected by means of supply wire 38 transmitting electrical current through terminal 11, contacts 13 and 14, terminal 12, wire 44, terminal 20, bi-metallic strip 4, contacts 5 and 6, bi-metallic strip 3, terminal 19, wire 50 and terminal 46 to the wire 39 leading to the regulated appliance. The connection in series of resistor elements 1 and 8 is effected by means of wire 52 leading from terminal 48 of heating resistance 8 to variable resistance 1. The series-coupled resistor elements are then connected in parallel to the circuit of the regulated appliance on the one hand through the connection of the sliding contact 18, lever 17, pivot 15, and wire 49, leading to terminal 43 and, on the other hand, through the connection of the resistance 8 with the wire 42, the terminal 19, the wire 50, and the terminal 46.

The advantage of this modification is that the variable resistance 1 will be independent of the amperage of the heating appliance and, therefore, adaptable for use with any heating appliance regardless of its power consumption. In view of the very small energy consumption of the controller, the resistance of the device may amount to about 12,000 ohms for conventional 110 volt circuits. This may result in some construction complexities not encountered in the construction shown in Fig. 6. In practice it is contemplated employing the modification shown in Fig. 7 under conditions where the controlled appliance draws large amounts of power.

The operation of this modification is essentially the same as that previously described.

It is, of course, understood that the scope of the invention is not to be limited by the specific embodiments disclosed, but may lend itself to a variety of expressions within the scope of the appended claims.

What I claim is:

1. An independent remote controller for varying the supply of electrical energy to and the temperature of electrical heating appliances, said controller comprising, in combination with a source of electrical energy, a casing, a variable resistance within said casing; a temperature responsive device for maintaining the temperature within said casing at a constant value, said temperature-responsive device comprising two temperature responsive strips and a heater body located between said strips, means operatively connecting said heater body in parallel with said variable resistance, interengaging contacts carried by said strips and adapted to move away from each other when said strips are heated by said heater body, whereby said parallel connected variable resistance and heater body being connected in series with said temperature responsive device operate intermittently for heating the interior of the casing and said strips; an insulating base plate, a central pivot carried by said plate, a lever rotating around said pivot, an electrical contact on one end of said lever, said contact sliding over said variable resistance during rotation of the lever to vary the ohmic value of said variable resistance, a disc fixed over said lever, manual means for rotating said disc and lever, a dial on the upper face of the disc for indicating the position of regulation through an opening formed in the cover of the casing, means on the end of said strips interrupting and reestablishing the supply current and means operatively connecting said controller in series with the appliance being regulated and the supply of electrical energy.

2. An independent remote controller for varying the supply of electrical energy to and the temperature of an electrical heating appliance, said controller comprising, in combination with a source of electrical energy, a casing, a variable resistance within said casing, a temperature-responsive device for maintaining the temperature within said casing at a constant value, said temperature-responsive device comprising two temperature-responsive strips and a heater body located between said strips and having one end operatively connected with one end of said variable resistance, interengaging contacts carried by said strips and adapted to open when said strips are heated to a predetermined extent, whereby said variable resistance and heater body which are connected in parallel with each other and in series with said temperature responsive device, operate intermittently for heating said strips and the interior of the casing, an insulating base plate, a central pivot carried by said plate, a conducting lever rotating around said pivot, an electrical contact on one end of said lever, said contact sliding over said variable resistance during rotation of the lever to vary the ohmic value of said variable resistance, means conductively connecting said lever with one of said strips and with the other end of said heater body, the temperature control-point of said strips being invariable at all times and at all positions of the lever, a disc fixed over said lever, manual means for rotating said disc and lever, a dial on the upper face of the disc for indicating the position of regulation through an opening formed in the cover of the casing, means on the end of said strips interrupting and reestablishing the supply current, means operatively connecting said first one end of the heater body with the supply of electrical energy, and means operatively connecting the other one of said strips with the heating appliance.

3. An independent remote controller for varying the supply of electrical energy to and the temperature of an electrical heating appliance, said controller comprising, in combination with a source of electrical energy, a casing, a variable resistance within said casing, a temperature-responsive device within said casing, for maintaining the temperature within said casing at a constant value, said temperature-responsive device comprising two temperature-responsive strips and a heater body located between said strips, means operatively connecting said heater body in parallel with said variable resistance, interengaging contacts carried by said strips and adapted to open when said strips are heated to a predetermined extent, whereby said variable resistance and heater body which are connected in parallel with each other and in series with said temperature responsive device, operate intermittently for heating said strips and the interior of the casing, an insulating base plate, a central pivot carried by said plate, a conducting lever rotating around said pivot, an electrical contact on one end of said lever, said contact sliding over said variable resistance during rotation of the lever to vary the ohmic value of said variable resistance, whereby a combined variable heating effect of said variable resistance and said heater body is obtained in accordance with each indication of the dial, means shortcircuiting the said variable resistance and said heater body in order to eliminate their heating effect upon the bimetallic strips, a disc fixed over said lever, manual means for rotating said disc and lever, a dial on the upper face of the disc for indicating the position of regulation through an opening formed in the cover of the casing means on the end of said strips interrupting and reestablishing the supply current and means operatively connecting said remote controller with the heating appliance and the supply of electrical energy.

4. An independent remote controller for an electrical heating appliance in combination with an electrical power source, the remote controller comprising a casing, a first and a second bimetallic strip for said casing, means for securing one end of each strip in said casing with the strips in spaced relationship, coacting contacts disposed on the free ends of said strips, a heater body of insulating material disposed in said casing intermediate said strips, a heater resistance disposed around said insulating material, an electrically conductive resistance element of arcuate form disposed in said casing, an electrically conductive lever pivotally disposed in said casing adjacent said resistance element, a contact disposed on said lever and coacting with said resistance element whereby the length thereof is varied, means for electrically connecting one end of said resistance element to said heater resistance adjacent the fixed ends of said bimetallic strips, means for electrically connecting the opposite end of said heater resistance to one end of said first bimetallic strip adjacent the fixed end thereof and to said lever, means for electrically connecting said first mentioned means to one side of the electrical power source, means for electrically connecting the second bimetallic strip adjacent the fixed end thereof to one side of the electrical heating appliance, means for electrically connecting the opposite side of the electrical heating appliance to the opposite side of the electrical power source, a cover member disposed over said casing, and means in said cover member for operating said lever.

References Cited in the file of this patent

UNITED STATES PATENTS

| Number | Name | Date |
|---|---|---|
| 1,500,260 | Replogle | July 8, 1924 |
| 1,835,616 | Schoenberg et al. | Dec. 8, 1931 |
| 2,209,768 | Dillman | July 30, 1940 |
| 2,220,061 | Brown | Nov. 5, 1940 |
| 2,302,924 | Valverde | Nov. 24, 1942 |
| 2,320,347 | Brosseau et al. | June 1, 1943 |
| 2,363,169 | Fischer | Nov. 21, 1944 |
| 2,379,602 | Stickel | July 3, 1945 |
| 2,479,319 | Crowley et al. | Aug. 16, 1949 |